(12) United States Patent
Hashimoto

(10) Patent No.: US 6,893,080 B2
(45) Date of Patent: May 17, 2005

(54) LOCK STRUCTURE FOR A DOOR PANEL BETWEEN CARGO AND PASSENGER COMPARTMENTS

(75) Inventor: Takashi Hashimoto, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/331,146

(22) Filed: Dec. 26, 2002

(65) Prior Publication Data

US 2003/0122394 A1 Jul. 3, 2003

(30) Foreign Application Priority Data

Dec. 26, 2001 (JP) .......................................... 2001-394964

(51) Int. Cl.⁷ .............................. B62D 33/06; E05C 3/06
(52) U.S. Cl. ................................ 296/190.11; 296/146.9; 292/217; 292/215
(58) Field of Search ............................ 296/26.08, 26.11, 296/191, 202, 36, 146.1, 147, 149, 146.9, 146.11, 146.13, 190.11, 24.1; 292/217, 215, 223, 196, DIG. 13, DIG. 29, DIG. 43

(56) References Cited

U.S. PATENT DOCUMENTS

| | | | | |
|---|---|---|---|---|
| 3,666,313 A | * | 5/1972 | Halstead et al. | |
| 4,480,868 A | * | 11/1984 | Koto | 296/190.11 |
| 5,265,450 A | * | 11/1993 | Doyle | 70/118 |
| 5,451,089 A | * | 9/1995 | Bender | 296/57.1 |
| 5,524,951 A | * | 6/1996 | Johnson | |
| 5,934,727 A | * | 8/1999 | Storc et al. | 296/26.11 |
| 6,276,751 B1 | * | 8/2001 | Ikarashi et al. | 296/190.11 |
| 6,416,104 B1 | * | 7/2002 | Fisher et al. | 296/37.16 |
| 6,447,051 B1 | * | 9/2002 | Lukomskiy | 296/190.11 |
| 6,450,566 B1 | * | 9/2002 | Hong | 296/190.11 |
| 6,481,772 B1 | * | 11/2002 | Tenn | 296/26.11 |
| 6,505,872 B2 | * | 1/2003 | Hong | 296/26.11 |
| 6,513,863 B1 | * | 2/2003 | Renke et al. | 296/190.11 |
| 6,550,849 B1 | * | 4/2003 | Dosdall | 296/183.1 |
| 6,575,515 B2 | * | 6/2003 | Hashimoto et al. | 296/26.11 |
| 6,616,199 B1 | * | 9/2003 | Tokach et al. | 292/56 |
| 6,786,535 B1 | * | 9/2004 | Grzegorzewski et al. | 296/190.11 |
| 6,796,600 B1 | * | 9/2004 | Ferer et al. | 296/146.1 |
| 2002/0070573 A1 | * | 6/2002 | Song | 296/26.11 |
| 2002/0089211 A1 | * | 7/2002 | Duffy | 296/190.11 |
| 2003/0011212 A1 | * | 1/2003 | Hashimoto et al. | 296/190.11 |

FOREIGN PATENT DOCUMENTS

JP 6-270684 * 9/1994 ............... 296/146.1

* cited by examiner

Primary Examiner—D. Glenn Dayoan
Assistant Examiner—H. Gutman
(74) Attorney, Agent, or Firm—Darby & Darby

(57) ABSTRACT

A lock structure for a door panel has a back panel for separating a passenger compartment and a cargo bed of a vehicle, in which an opening portion is formed to communicate the passenger compartment with the cargo bed. The door panel is provided for opening or closing the opening portion. The lock structure comprises a lock mechanism mounted in the back panel and at an edge of the opening portion, a striker mounted on the door panel for engaging with the lock mechanism, and an unlock mechanism mounted in both the back panel and the door panel for disengaging between the lock mechanism and the striker. According to the structures, the thickness of the door panel can be decreased to ensure the space of the passenger compartment, so that the design or layout of the door panel and the space of the rear seat is not restricted. Further, the user can easily open the door panel.

4 Claims, 3 Drawing Sheets

LOCK STRUCTURE FOR A DOOR PANEL BETWEEN CARGO AND PASSENGER COMPARTMENTS

BACKGROUND OF THE INVENTION

The present invention relates to a lock structure for a door panel, in particular, to the lock structure for a hinged door panel mounted on a back panel which separates a passenger compartment and a cargo bed of a vehicle.

The present application claims priority from Japanese Patent Application No. 2001-394964.

In response to the diversification of consumers' needs, car manufacturers have produced more and more car-based pickup trucks and car- or truck-based sport utility vehicles (SUVs) in recent years, as these vehicles offer both the practicality of trucks with a large cargo capacity and a comfortability of passenger cars. Some of these pickup trucks are provided with an opening with the hinged door panel in the back panel which separates the passenger compartment and the cargo bed. Whenever it is necessary, the rear seats are folded down, and the door panel is pushed forward, i.e., toward the passenger compartment to open the opening, so that more space can be used for loading cargo.

A door through which the passenger gets on and off a vehicle is usually provided with a lock mechanism (latch assembly) on a side of the door, and a striker on a door opening portion of a vehicle body. When the door is closed, the striker is engaged with the lock mechanism. Assuming that such a mechanism is used in the case of the door panel, that is, the lock mechanism is mounted on the side of the door panel, and the striker is on the side of the back panel, the thickness of the door panel is increased, so that not only the space of the passenger compartment may be reduced, but also an undesirable effect may be produced on the design of the door panel and/or the rear seat, namely, the free design of the entire vehicle may be restricted.

In addition, when the door panel is released in the lock condition with the back panel, it is designed to fall down forward. Therefore, the user is forced to support the door panel so as not to suddenly bring it down at the same time as releasing the lock condition, namely, that increases a user's load.

SUMMARY OF THE INVENTION

The present invention is devised to resolve the problems encountered by the conventional lock structure for the door panel as mentioned above. An object of the present invention is to provide a lock structure for a door panel in which the thickness of the door panel is reduced, the design for the door panel and/or a rear seat is not restricted, and further a load of the user is also reduced.

In order to achieve the above objects, according to the first aspect of the present invention, there is provided a lock structure for a door panel having a back panel for separating a passenger compartment and a cargo bed of a vehicle, in which an opening portion is formed to communicate the passenger compartment with the cargo bed, the door panel being used for opening or closing the opening portion, comprising a lock mechanism mounted in the back panel and at an edge of the opening portion, a striker mounted on the door panel for engaging with the lock mechanism, and an unlock mechanism mounted in both the back panel and door panel for removing an engagement between the lock mechanism and the striker.

According to the second aspect of the present invention, in addition to the first aspect, the unlock mechanism comprises a lever member, which is rotatable by a predetermined angle, mounted in the door panel, and a linking member, which is rotated by a rotation of the lever member to unlock the lock mechanism, mounted in the back panel.

According to the third aspect of the present invention, in addition to the second aspect, the unlock mechanism further comprises a rod member for connecting the linking member and the lock mechanism, wherein a rotation of the linking member is transmitted to the lock mechanism through the rod member so as to unlock the lock mechanism, and wherein an inverted rotation of the lock mechanism to operate the mechanism is transmitted to the linking member through the rod member.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

Figure 1:
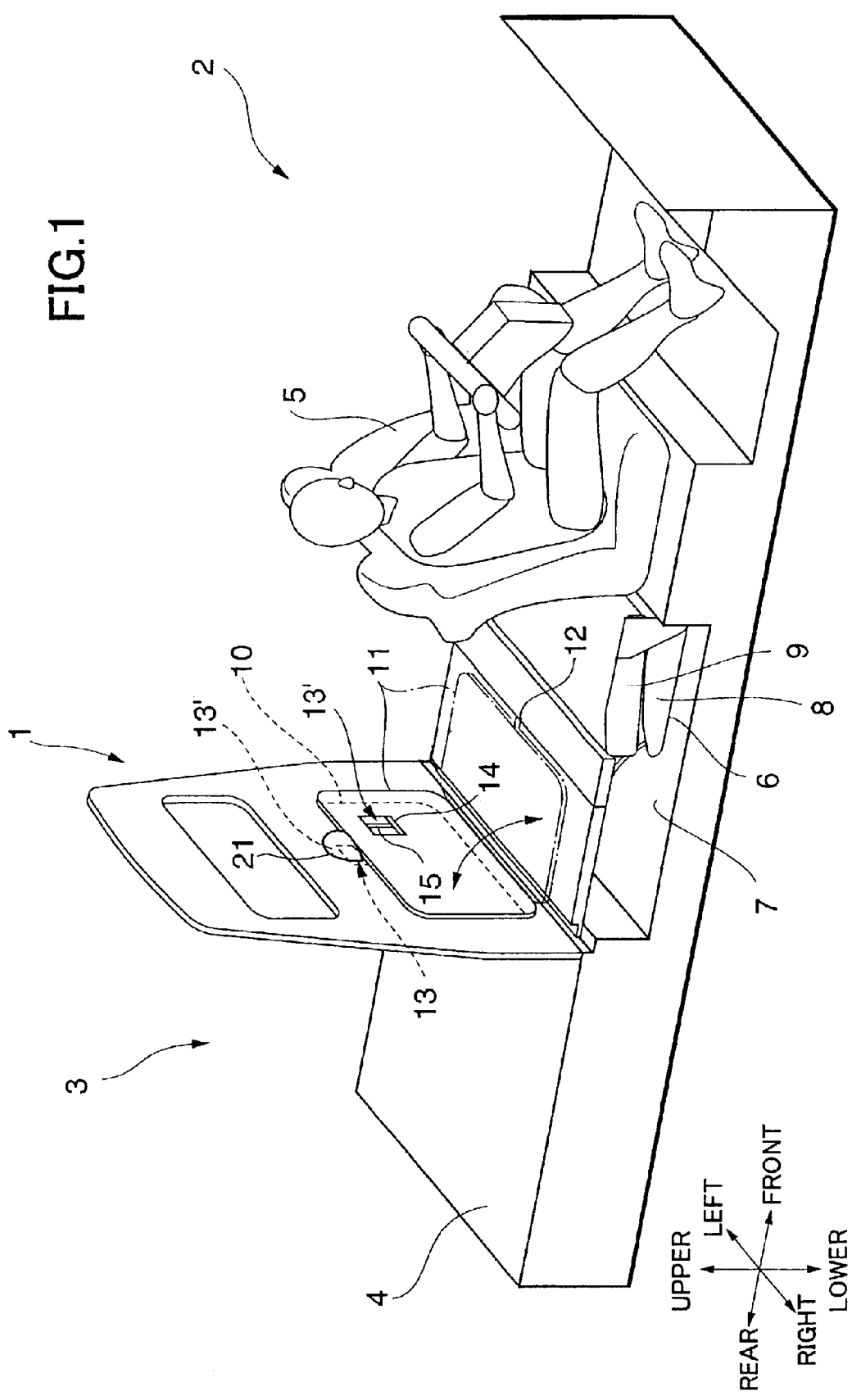
FIG. 1 is a perspective view for explaining a lock structure for a door panel to which the present invention is applied.

Preferred embodiments according to the present invention will be hereinafter described with reference to the accompanying drawings. FIG. 1 is a perspective view for explaining a lock structure for a door panel to which the present invention is applied, FIG. 2 is a schematically side cross-sectional view illustrating essential parts in FIG. 1 for explaining an unlock structure, and FIG. 3 is a schematically cross-sectional view taken along the line A—A of FIG. 2 as seen from the direction of the arrows.

Figure 2:
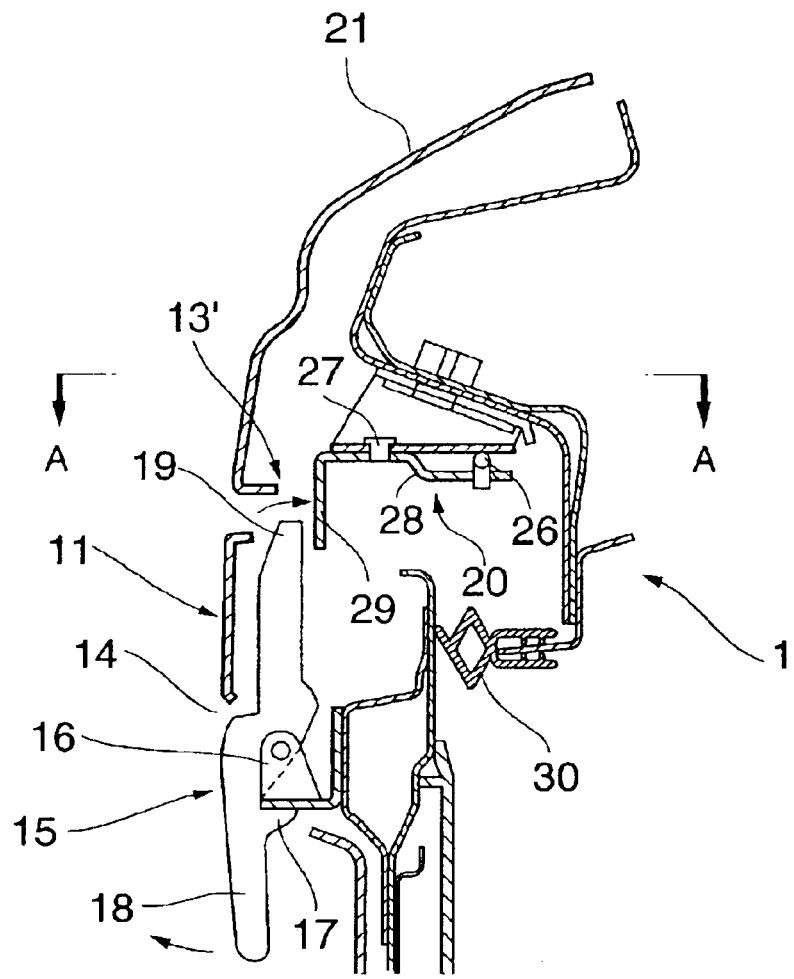
FIG. 2 is a schematically side cross-sectional view illustrating essential parts in FIG. 1 for explaining an unlock structure.
Figure 2:
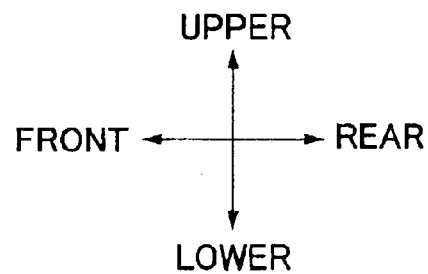
Figure 3:
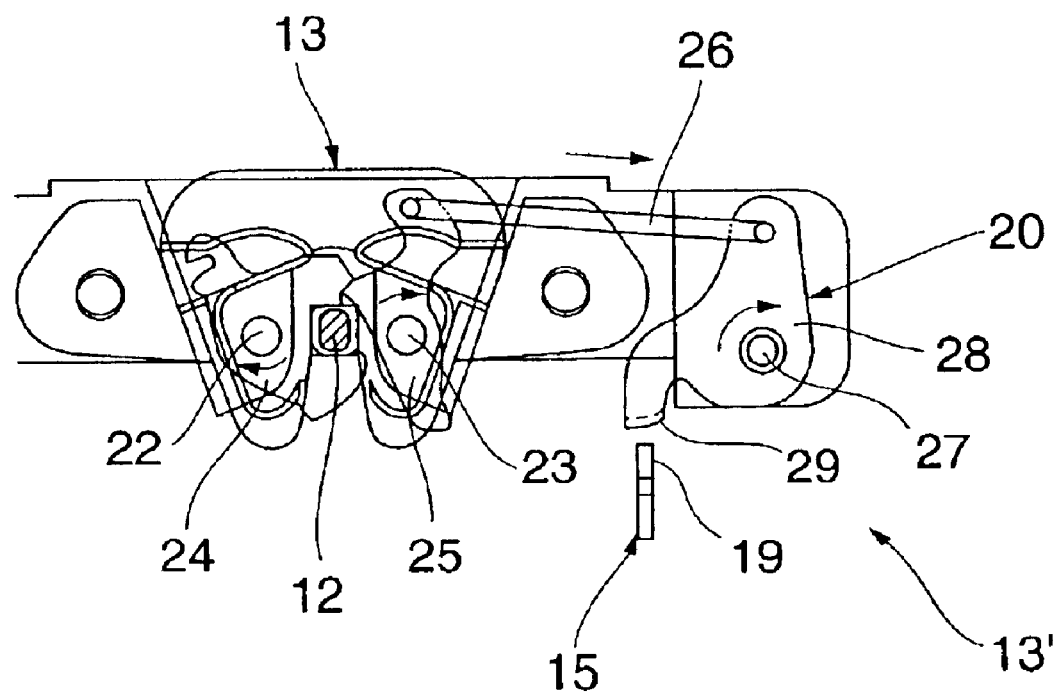
FIG. 3 is a schematically cross-sectional view taken along the line A—A of FIG. 2 as seen from the direction of the arrows.
Figure 3:
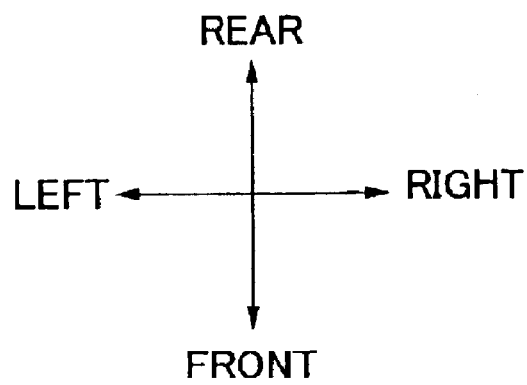

As can be seen from FIGS. 1 to 3, a back panel 1 is a partition member for separating a passenger compartment 2 and a cargo bed 3 of a car-based pickup truck having a monocoque structure. A lower end portion of the back panel 1 is fixedly jointed to and along a front end portion of a cargo bed floor 4. Both left and right side edges of the back panel 1 are fixedly jointed to left and right side walls (not shown) of a vehicle body.

On the front side of the back panel 1, i.e., on the side of the passenger compartment 2 are arranged a front seat 5 and a rear seat 6 which form two lines in front and behind, respectively. The back panel 1 is arranged just behind the rear seat 6.

The rear seat 6 is foldably mounted on a rear floor 7, which is lower by one step than the cargo bed floor 4, by double-folding the rear seat 6. That is, rear seat 6 with a seatback 8 folded on a seat cushion 9 can be inverted forwardly into a front portion of the rear seat 6. That is, the seat cushion 9 may be pulled out and pushed down with the seatback 8 to make a full-flat rear seat 6. Thus, when the rear seat 6 is folded, on a back side of the passenger compartment 2 is formed a plane having substantially the same level as the cargo bed floor 4, putting the back panel 1 between the plane and the cargo bed floor 4.

In the back panel 1 behind the seatback 8 of the rear seat 6 is formed a rectangular opening 10 (as shown by a broken line in FIG. 1) for communicating the cargo bed 3 with the passenger compartment 2. At a front side of the opening 10 is attached a door panel 11 which is rotatably supported by a hinge (not shown), so that the opening 10 can be opened or closed by rotating the door panel 11 around the hinge as shown by a two-dotted chain line.

The door panel 11 has a striker 12 jointed together by a bolt so as to be adjustable at an upper edge portion thereof under the closed situation or at a center of a front edge portion under the open situation. When the door panel 11 is closed, the striker 12 is engaged with a lock mechanism 13, as described later, provided in the back panel 1. A front surface of the door panel 11 has a concave portion 14 such as a pocket toward an inside thereof, in which an inner handle 15 as a lever for removing an engagement between the striker 12 and the lock mechanism 13 is installed, and forms a part of an unlock mechanism 13'.

As shown in FIG. 2, a longitudinal part of the inner handle 15 extends in a vertical direction when the door panel 11 is closed, and upper and lower end portions thereof are exposed from the door panel 11. Central right and left side portions of the inner handle 15 are rotatably supported by a supporting bracket 16 which is fixed inside the back panel 1 within a vertical plane thereof. The supporting bracket 16 is provided with a forcing spring (not shown) for constantly forcing the inner handle 15 in a counter-clockwise direction in FIG. 2. The inner handle 15 has a stopper 17 with a projecting shape at a rear end portion thereof. When the stopper 17 contacts with a lower plane of the supporting bracket 16, the rotating area of the inner handle 15 is restricted. Thus, the inner handle 15 can be constantly kept to be erect in a vertical direction thereof without rattle, and also be rotated by a predetermined angle in a clockwise direction without interference with the inside of the door panel 11.

Further, the inner handle 15 has a grip 18, through which a user operates it, at a lower end thereof, and also has a pressing portion 19 at an upper end. Therefore, when the grip 18 is pulled toward the passenger compartment 2, the pressing portion 19 is rotated by a predetermined angle in the clockwise direction.

Incidentally, the shape of the inner handle 15 is not limited to the foregoing, but may be one of an hook-type outer handle as mounted on an ordinary door.

As shown in FIG. 3, at a predetermined position in the back panel 1 behind the inner handle 15, there are provided the well-known lock mechanism 13 for engaging with the striker 12 of the door panel 11, and the unlock mechanism 13' for unlocking the lock mechanism 13 by cooperating together with the inner handle 15. The unlock mechanism 13' is provided with an intermediate linking member 20 as part thereof. As can be seen from FIGS. 1 and 2, these parts are covered by a protective cover 21 in order to prevent foreign substances from entering into the lock mechanism 13 when the door panel 11 is closed by fitting the striker 12 into the lock mechanism 13. Moreover, the lock mechanism 13 is not shown in FIG. 2 since it is illustrated for mainly explaining the unlock structure.

The lock mechanism 13 is provided with a pair of latches 24, 25 arranged in the right and left directions, which are rotatable around rotating shafts 22, 23 as shown by arrows of FIG. 3 within a plane thereof. The striker 12 is closely inserted into or removed from a space formed between the both latches 24, 25. The lock mechanism 13 can remove the engagement with the striker 12 through a cooperation between the both latches 24, 25, the cooperation of which is performed by rotating each latch 24, 25 in the clockwise direction.

More specifically, a rear end of the latch 25 is jointed to a left end of a movable rod 26 which connects the latch 25 with the intermediate linking member 20. When the rod 26 is moved in the right direction as shown by an arrow, the latch 25 is rotated in the clockwise direction around the rotating shaft 23 to be apart from the latch 24. Further, when the latch 25 rotates, the latch 24 also rotates in the clockwise direction around the rotating shaft 22 to be apart from the striker 12, so that the striker 12 can be removed from the latches 24, 25. Moreover, a right end of the rod 26 is jointed at a rear end of the intermediate linking member 20.

The intermediate linking member 20 is provided with a main body 28 which is rotatable around a rotating shaft 27 within a plane thereof, and a flange portion 29 which extends toward a center line of a vehicle and has a front end extended down therefrom by a predetermined distance. The pressing portion 19 of the inner handle 15 contacts with the front end of the flange portion 29. Then, the flange portion 29 is pressed out toward a rear side of the vehicle by the pressing portion 19 of the inner handle 15, so that the intermediate linking member 20 is rotated around the rotating shaft 27 in the clockwise direction, and thus the rod 26 is moved in the right direction as shown by an arrow in FIG. 3.

That is, when the user pulls the inner handle 15 out toward the passenger compartment 2, the unlock operation of the lock mechanism 13 in the back panel 1 removes the striker 12 from the lock mechanism 13.

On the other hand, the intermediate linking member 20 rotated in the clockwise direction returns to the original state when the door panel 11 is closed, in particular, the striker 12 is engaged with the lock mechanism 13, so that the latch 25 is rotated in the counter-clockwise direction. According to the rotation of the latch 25, the rod 26 is moved in the left direction, and as a result, the intermediate linking member 20 is rotated in the counter-clockwise direction such that the linking member 20 is kept apart from the pressing portion 19. More specifically, an adequate distance is kept between the inner handle 15 and the flange portion 29 so as to avoid the pressing portion 19 from interfering with the flange portion 29 due to an impact caused when the door panel 11 is closed. Additionally, an entire circumferential edge of the opening 10 at the side of the cargo bed 3 is provided with a weather strip 30 in order to reduce the impact force caused by closing the door panel 11 and prevent rain water or noise from entering into the passenger compartment 2.

As mentioned above, according to the present invention, the back panel 1 for separating the passenger compartment 2 and the cargo bed 3 of the monocoque pickup truck is provided with the opening 10 behind the seatback 8 of the rear seat 6. The door panel 11 for opening/closing the opening 10 is attached to the front side of the opening 10. At the upper end portion of the opening 10 of the back panel 1, there is provided the lock mechanism 13 and the intermediate linking member 20 as a part of the unlock mechanism 13' in which both are connected by the rod 26. Also, the door panel 11 is provided with the striker 12 and the inner handle 15 as the other part of the unlock mechanism 13'. In a word, the unlock mechanism 13' is divided into two, and the respective divided parts are arranged in the back panel 1 and the door panel 11. The parts of the lock/unlock mechanism 13, 13' having much thickness in the front and rear direction of the vehicle are arranged in the back panel 1, while the thin parts of the lock/unlock mechanism 13, 13' are arranged in the door panel 11. Thus, the door panel 11 mounted on the back panel 1 can be thinned, so that the door panel 11 does not decrease the space of the passenger compartment 2, but enables the thickness of the seatback 8 as disposed forward of the panel 11 to be increased. Specifically, the freedom of the design or layout within the passenger compartment 2 can be expanded.

In addition, the user can perform the unlock operation of the lock mechanism 13 in the back panel 1 only by pulling the inner handle 15 toward the passenger compartment 2, and also under the condition of the inner handle 15 being pulled, the user can slowly bring the door panel 11 down after unlocking the lock mechanism 13 since the door panel of the present invention is lighter in weight than a conventional door panel. In such a way, the load of the user can be largely reduced, and the convenience of the user can be improved.

In the foregoing embodiment, only one striker is formed on the central and upper portion of the door panel 11, but it may be arranged at a position other than the central and upper portion, or a plurality of strikers may be formed there.

As can be seen from the foregoing, according to the lock structure for the door panel of the present invention, the thickness of the door panel can be decreased to ensure the space of the passenger compartment is not reduced, so that the design or layout of the door panel and the rear seat is not restricted. Further, the load of the user usually caused when the back panel is opened can be reduced.

While there have been described what are at present considered to be preferred embodiments of the present invention, it will be understood that various modifications may be made thereto, and it is intended that the appended claims cover all such modifications as fall within the true spirit and scope of the present invention.

What is claimed is:

1. A lock structure of a door panel provided on an opening of a back panel for separating a passenger compartment and a cargo bed of a vehicle, and for communicating the passenger compartment with the cargo bed, comprising:

a single lock mechanism mounted in the back panel and at a top edge of an opening portion;

a striker mounted on a top edge of the door panel for engaging with the lock mechanism; and an unlock mechanism mounted in both the back panel and the door panel for disengaging the lock mechanism from the striker.

2. The lock structure according to claim 1, further comprising:

a lever member mounted in the door panel for being rotatable by a predetermined angle; and a linking member mounted in the back panel for being rotatable by a rotation of the lever member and for unlocking the lock mechanism.

3. The lock structure according to claim 2, further comprising:

a rod member mounted in the back panel for connecting the linking member and the lock mechanism, wherein a counter clockwise rotation of the linking member is transmitted to the lock mechanism through the rod member so as to unlock the lock mechanism, and wherein a clockwise rotation of the linking member for operating the lock mechanism is transmitted through the rod member.

4. The lock structure according to claim 1, wherein the single lock mechanism is mounted at a center position in a widthwise direction of the top edge of the opening portion.

* * * * *